US012603722B2

(12) United States Patent　　　(10) Patent No.: US 12,603,722 B2
Regev et al.　　　　　　　　　　　(45) Date of Patent: Apr. 14, 2026

(54) CHANNEL STATE FEEDBACK REPORT FOR FREQUENCY DEPENDENT RESIDUAL SIDE BAND IMPAIRMENTS

(71) Applicant: QUALCOMM Incorporated, San Diego, CA (US)

(72) Inventors: Aviv Regev, Tel Aviv (IL); Ronen Shaked, Kfar Saba (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 18/175,689

(22) Filed: Feb. 28, 2023

(65) Prior Publication Data

US 2024/0291585 A1　　Aug. 29, 2024

(51) Int. Cl.
*H04W 72/0453*　　　(2023.01)
*H04L 1/00*　　　　　(2006.01)

(52) U.S. Cl.
CPC ....... *H04L 1/0003* (2013.01); *H04W 72/0453* (2013.01)

(58) Field of Classification Search
None
See application file for complete search history.

(56) References Cited

U.S. PATENT DOCUMENTS

| 2007/0207742 | A1* | 9/2007 | Kim | H04B 17/336 |
| | | | | 455/67.11 |
| 2010/0103920 | A1* | 4/2010 | Damnjanovic | H04L 5/006 |
| | | | | 370/344 |
| 2016/0233989 | A1* | 8/2016 | Belghoul | H04W 72/20 |
| 2021/0328837 | A1* | 10/2021 | Pick | H04B 7/0621 |
| 2021/0360635 | A1* | 11/2021 | Sahraei | H04L 27/2614 |
| 2024/0039655 | A1* | 2/2024 | Rudolf | H04L 1/0003 |

* cited by examiner

*Primary Examiner* — The Hy Nguyen
(74) *Attorney, Agent, or Firm* — QUALCOMM Incorporated

(57)　　　　　ABSTRACT

Various aspects of the present disclosure generally relate to wireless communication. In some aspects, a user equipment (UE) may transmit a channel state feedback (CSF) report indicating a first modulation and coding scheme (MCS) associated with a first one or more frequency domain resources of a frequency domain resource allocation, and a second MCS associated with a second one or more frequency domain resources of the frequency domain resource allocation, the first one or more frequency domain resources being associated with a frequency dependent residual side band (FDRSB) impairment. The UE may receive an indication that the first MCS and that the second MCS is to be used. The UE may receive one or more signals using the first MCS to decode the first one or more frequency domain resources and using the second MCS to decode the second one or more frequency domain resources. Numerous other aspects are described.

30 Claims, 10 Drawing Sheets

600 ⟶

610
Associated with a
first MCS

615
Associated with a
second MCS

Carrier
frequency

605
Frequency domain allocation (bandwidth)

Frequency ⟶

500

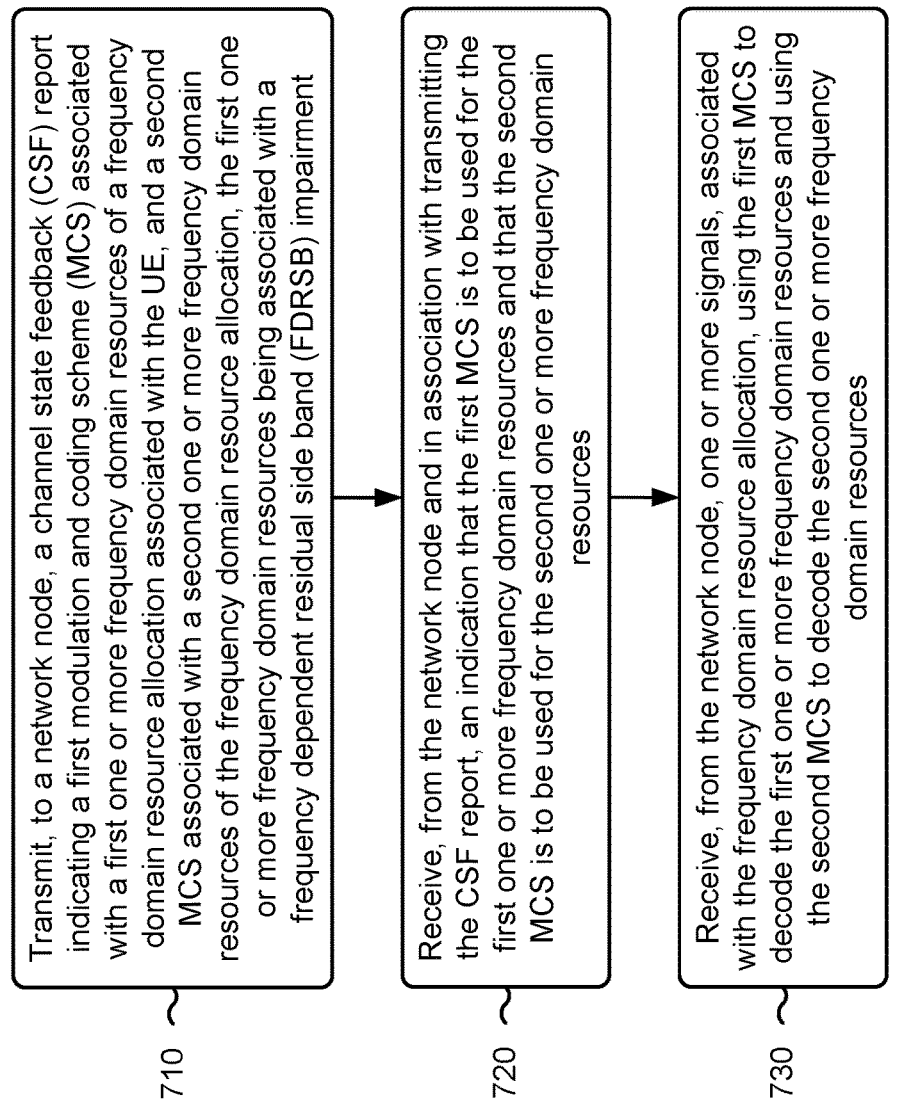

Transmit, to a network node, a channel state feedback (CSF) report indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment

710

Receive, from the network node and in association with transmitting the CSF report, an indication that the first MCS is to be used for the first one or more frequency domain resources and that the second MCS is to be used for the second one or more frequency domain resources

720

Receive, from the network node, one or more signals, associated with the frequency domain resource allocation, using the first MCS to decode the first one or more frequency domain resources and using the second MCS to decode the second one or more frequency domain resources

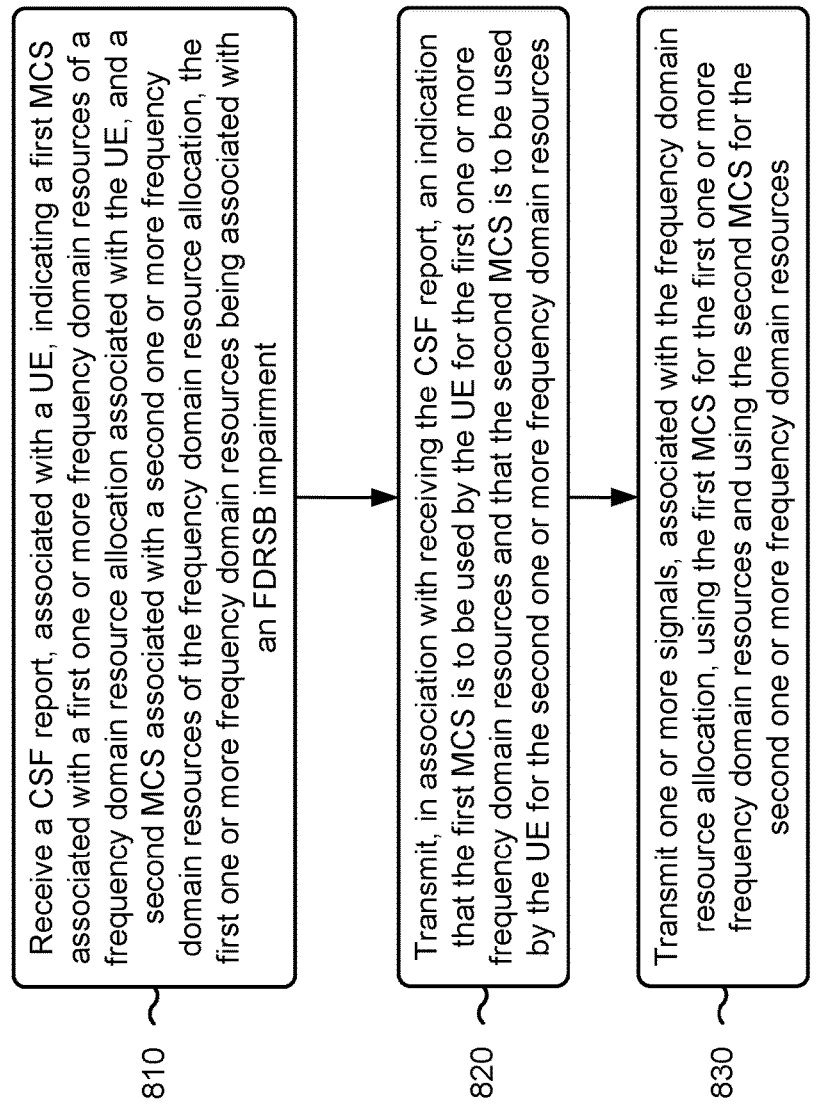

800

810 — Receive a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment 820 — Transmit, in association with receiving the CSF report, an indication that the first MCS is to be used by the UE for the first one or more frequency domain resources and that the second MCS is to be used by the UE for the second one or more frequency domain resources 830 — Transmit one or more signals, associated with the frequency domain resource allocation, using the first MCS for the first one or more frequency domain resources and using the second MCS for the second one or more frequency domain resources

FIG. 8

CHANNEL STATE FEEDBACK REPORT FOR FREQUENCY DEPENDENT RESIDUAL SIDE BAND IMPAIRMENTS

FIELD OF THE DISCLOSURE

Aspects of the present disclosure generally relate to wireless communication and to techniques and apparatuses associated with a channel state feedback report for frequency dependent residual side band impairments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit, to a network node, a channel state feedback (CSF) report indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment. The one or more processors may be configured to receive, from the network node and in association with transmitting the CSF report, an indication that the first MCS is to be used for the first one or more frequency domain resources and that the second MCS is to be used for the second one or more frequency domain resources. The one or more processors may be configured to receive, from the network node, one or more signals, associated with the frequency domain resource allocation, using the first MCS to decode the first one or more frequency domain resources and using the second MCS to decode the second one or more frequency domain resources.

Some aspects described herein relate to a network node for wireless communication. The network node may include a memory and one or more processors coupled to the memory. The one or more processors may be configured to receive a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The one or more processors may be configured to transmit, in association with receiving the CSF report, an indication that the first MCS is to be used by the UE for the first one or more frequency domain resources and that the second MCS is to be used by the UE for the second one or more frequency domain resources. The one or more processors may be configured to transmit one or more signals, associated with the frequency domain resource allocation, using the first MCS for the first one or more frequency domain resources and using the second MCS for the second one or more frequency domain resources.

Some aspects described herein relate to a method of wireless communication performed by a UE. The method may include transmitting, to a network node, a CSF report indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The method may include receiving, from the network node and in association with transmitting the CSF report, an indication that the first MCS is to be used for the first one or more frequency domain resources and that the second MCS is to be used for the second one or more frequency domain resources. The method may include receiving, from the network node, one or more signals, associated with the frequency domain resource allocation, using the first MCS to decode the first one or more frequency domain resources and using the second MCS to decode the second one or more frequency domain resources.

Some aspects described herein relate to a method of wireless communication performed by a network node. The method may include receiving a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The method may include transmitting, in association with receiving the CSF report, an indication that the first MCS is to be used by the UE for the first one or more frequency domain resources and that the second MCS is to be used by the UE for the second one or more frequency domain resources. The method may include transmitting one or more signals, associated with the frequency domain resource allocation, using the first MCS for the first one or more frequency domain resources and using the second MCS for the second one or more frequency domain resources.

Some aspects described herein relate to a non-transitory computer-readable medium that stores a set of instructions for wireless communication by a UE. The set of instructions, when executed by one or more processors of the UE, may cause the UE to transmit, to a network node, a CSF report indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The set of instructions, when executed by one or more processors of the UE, may cause the UE to receive, from the network node and in association with transmitting the CSF report, an indication that the first MCS is to be used for the first one or more frequency domain resources and that the second MCS is to be used for the second one or more frequency domain resources. The set of instructions, when executed by one or more processors of the UE, may cause the UE to receive, from the network node, one or more signals, associated with the frequency domain resource allocation, using the first MCS to decode the first one or more frequency domain resources and using the second MCS to decode the second one or more frequency domain resources.

Some aspects described herein relate to a non-transitory computer-readable medium that stores a set of instructions for wireless communication by a network node. The set of instructions, when executed by one or more processors of the network node, may cause the network node to receive a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The set of instructions, when executed by one or more processors of the network node, may cause the network node to transmit, in association with receiving the CSF report, an indication that the first MCS is to be used by the UE for the first one or more frequency domain resources and that the second MCS is to be used by the UE for the second one or more frequency domain resources. The set of instructions, when executed by one or more processors of the network node, may cause the network node to transmit one or more signals, associated with the frequency domain resource allocation, using the first MCS for the first one or more frequency domain resources and using the second MCS for the second one or more frequency domain resources.

Some aspects described herein relate to an apparatus for wireless communication. The apparatus may include means for transmitting, to a network node, a CSF report indicating a first MCS associated with a first one or more frequency domain resources of a frequency domain resource allocation associated with the apparatus, and a second MCS associated with a second one or more frequency domain resources of the frequency domain resource allocation, the first one or more frequency domain resources being associated with an FDRSB impairment. The apparatus may include means for receiving, from the network node and in association with transmitting the CSF report, an indication that the first MCS is to be used for the first one or more frequency domain resources and that the second MCS is to be used for the second one or more frequency domain resources. The apparatus may include means for receiving, from the network node, one or more signals, associated with the frequency domain resource allocation, using the first MCS to decode the first one or more frequency domain resources and using the second MCS to decode the second one or more frequency domain resources.

Some aspects described herein relate to an apparatus for wireless communication. The apparatus may include means for receiving a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The apparatus may include means for transmitting, in association with receiving the CSF report, an indication that the first MCS is to be used by the UE for the first one or more frequency domain resources and that the second MCS is to be used by the UE for the second one or more frequency domain resources. The apparatus may include means for transmitting one or more signals, associated with the frequency domain resource allocation, using the first MCS for the first one or more frequency domain resources and using the second MCS for the second one or more frequency domain resources.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Figure 1:
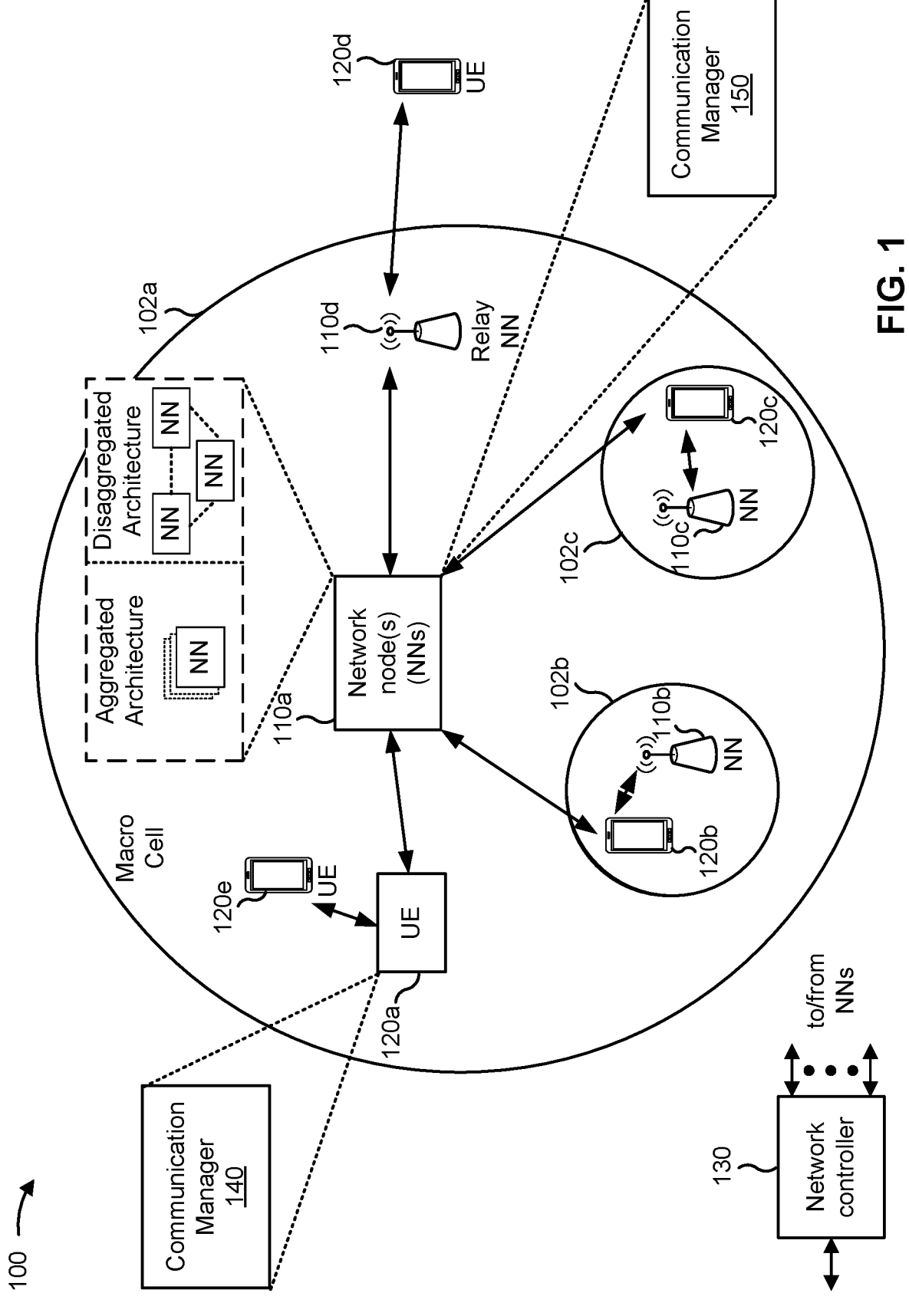
FIG. 1 is a diagram illustrating an example of a wireless network, in accordance with the present disclosure.

In some cases, in-phase/quadrature (IQ) modulators may be used to conserve bandwidth for a given data rate by modulating two orthogonal data streams (e.g., an in-phase (I) data stream and a quadrature (Q) data stream) onto a common carrier. If the phases and amplitudes for both data streams were to match, then one of the sidebands would be completely cancelled out. In practice, however, complete cancelation is rarely accomplished because IQ modulators typically have a mismatch with respect to amplitude and/or phase between the I and Q branches, which results in a frequency dependent residual side band (FDRSB) impairment at the output from each IQ modulator. For example, an FDRSB (sometimes called an IQ mismatch or frequency-dependent IQ mismatch) is an inherent impairment in an IQ modulator, and generally corresponds to a signal self-image caused by an IQ imbalance in an IQ modulator. The FDRSB may be a signal that generally has a smaller amplitude than a desired signal, appearing at a negative of a frequency of a desired signal. For example, a first signal that is allocated at subcarrier fi relative to a carrier frequency $f_c$ is subject to an FDRSB impairment by a second signal allocated at a mirror frequency −fi, and vice versa. In general, the characteristics of the FDRSB may vary depending on one or more factors or parameters, such as the distance of the FDRSB from a local oscillator (LO) frequency, a frequency band used for communication, a gain state, and/or a thermal state of the IQ modulator, among other examples.

This FDRSB may cause signaling on a first subcarrier to interfere with a second subcarrier that is a mirror of the first subcarrier about a carrier frequency (e.g., with respect to the carrier frequency). For example, the first subcarrier may be a distance from the carrier frequency in a positive direction (e.g., above the carrier frequency), and the second subcarrier may be the same distance from the carrier frequency in a negative direction (e.g., below the carrier frequency). Based at least in part on a transmission using the IQ modulators, modulated signals may have FDRSB. Antenna elements may provide received streams to a demodulator. In some examples, the demodulator may be unable to correctly demodulate the received streams based at least in part on the FDRSB associated with the IQ modulators. In these examples, the receiving device and the transmitting device may consume power, processing resources, and/or communication resources to detect and correct demodulation errors or failures in the received streams. For example, the receiving device may provide hybrid automatic repeat request acknowledgment (HARQ-ACK) feedback to indicate a demodulation and/or decoding error, which may trigger a retransmission of communications associated with the streams.

Accordingly, because an FDRSB is an undesired output from an IQ modulator that can increase bit errors or otherwise limit link performance in a wireless network, it is desirable for the FDRSB impairment to be mitigated (e.g., for the FDRSB to be cancelled out). For example, in some cases, a network node may be equipped with dedicated hardware in each IQ modulator lane to cancel the corresponding FDRSB, where the dedicated hardware may include a radio frequency (RF) demodulator feedback chain coupled to the output from an IQ modulator, an analog-to-digital converter (ADC) to sample the output from the IQ modulator via the RF demodulator feedback chain, and one or more components to perform digital FDRSB estimation and cancelation (e.g., estimating a phase difference and/or an amplitude difference and compensating for the phase difference and/or amplitude difference in an imperfectly mixed information signal). However, as wireless networks have progressed to support higher modulation orders (e.g., 1K quadrature amplitude modulation (QAM), 4K QAM, or 16K QAM) and/or to support millimeter wave (mmW) communications and expand into sub-terahertz (sub-THz) communications and beyond, the network node could potentially use many antennas that are fed by many IQ modulators in order to achieve a sufficiently narrow beamwidth (or high beamforming gain) to compensate for the path loss that occurs due to the high carrier frequency. As a result, the need for many antennas that are fed by numerous IQ chains may significantly increase the cost and complexity associated with burdening the network node with estimating and cancelling numerous FDRSB parameters across the numerous IQ modulator lanes (e.g., because each IQ modulator lane would need to be equipped with dedicated hardware to estimate and cancel the FDRSB in the respective IQ modulator lane). Further, when the higher order modulations (e.g., 1K QAM, 4K QAM, and/or 16K QAM) are used, if the FDRSB impairment is not mitigated or cancelled, the FDRSB impairment may become a limiting noise floor of communications between a user equipment (UE) and a network node, resulting in the UE being unable to correctly demodulate received communications associated with the FDRSB impairment.

Some techniques and apparatuses described herein are associated with a channel state feedback (CSF) report for FDRSB impairments. For example, in some cases, a frequency domain allocation (e.g., a bandwidth) of a UE may be an asymmetric allocation with respect to a carrier frequency. Therefore, some frequency domain resources (e.g., subcarriers) within the allocation may be associated with an FDRSB impairment (e.g., because they have a mirrored frequency in the allocation) and other frequency domain resources (e.g., subcarriers) within the allocation may not be associated with an FDRSB impairment (e.g., because they do not have a mirrored frequency in the allocation).

Therefore, a UE may transmit, and a network node may receive, an indication (e.g., in a CSF report) of a first modulation and coding scheme (MCS) to be (e.g., requested to be) associated with frequency domain resources within an allocation (e.g., a bandwidth) that are associated with an FDRSB impairment and a second MCS to be (e.g., requested to be) associated with frequency domain resources within the allocation (e.g., the bandwidth) that are not associated with an FDRSB impairment. The UE may be configured (e.g., by the network node) to use the first MCS (e.g., for a first one or more frequency domain resources within the bandwidth) and to use the second MCS (e.g., for a second one or more frequency domain resources within the bandwidth). The network node may transmit, and the UE may receive, signals associated with the first one or more frequency domain resources using the first MCS and signals associated with the second one or more frequency domain resources using the second MCS.

As a result, the UE and/or the network node may be enabled to use a higher order MCS for frequency domain resources that are not associated with an FDRSB impairment, and to use a lower order MCS for frequency domain resources that are associated with an FDRSB impairment. Enabling the UE and the network node to use the higher order MCS for a portion of the frequency domain allocation that is not associated with an FDRSB impairment improves spectral efficiency, improves a transmission rate, and/or reduces an error rate of communications, among other examples. Additionally, enabling the UE and the network node to use a lower order MCS for a portion of the frequency domain allocation that is associated with an FDRSB impairment improves a likelihood that the network node is able to mitigate the FDRSB impairment (e.g., to cancel the FDRSB). As a result, signals that are transmitted and/or received via the frequency domain allocation are associated with a higher spectral efficiency, a higher transmission rate, and/or a reduced error rate, among other examples, while also not degrading the reliability of a demodulation of signals communicated via the frequency domain allocation.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, a CSF report indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment; receive, from the network node and in association with transmitting the CSF report, an indication that the first MCS is to be used for the first one or more frequency domain resources and that the second MCS is to be used for the second one or more frequency domain resources; and receive, from the network node, one or more signals, associated with the frequency domain resource allocation, using the first MCS to decode the first one or more frequency domain resources and using the second MCS to decode the second one or more frequency domain resources. Additionally, or alternatively, the communication manager 140 may perform one or more other operations described herein.

In some aspects, the network node 110 may include a communication manager 150. As described in more detail elsewhere herein, the communication manager 150 may receive a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment; transmit, in association with receiving the CSF report, an indication that the first MCS is to be used by the UE for the first one or more frequency domain resources and that the second MCS is to be used by the UE for the second one or more frequency domain resources; and transmit one or more signals, associated with the frequency domain resource allocation, using the first MCS for the first one or more frequency domain resources and using the second MCS for the second one or more frequency domain resources. Additionally, or alternatively, the communication manager 150 may perform one or more other operations described herein.

As indicated above, FIG. 1 is provided as an example. Other examples may differ from what is described with regard to FIG. 1.

Figure 2:
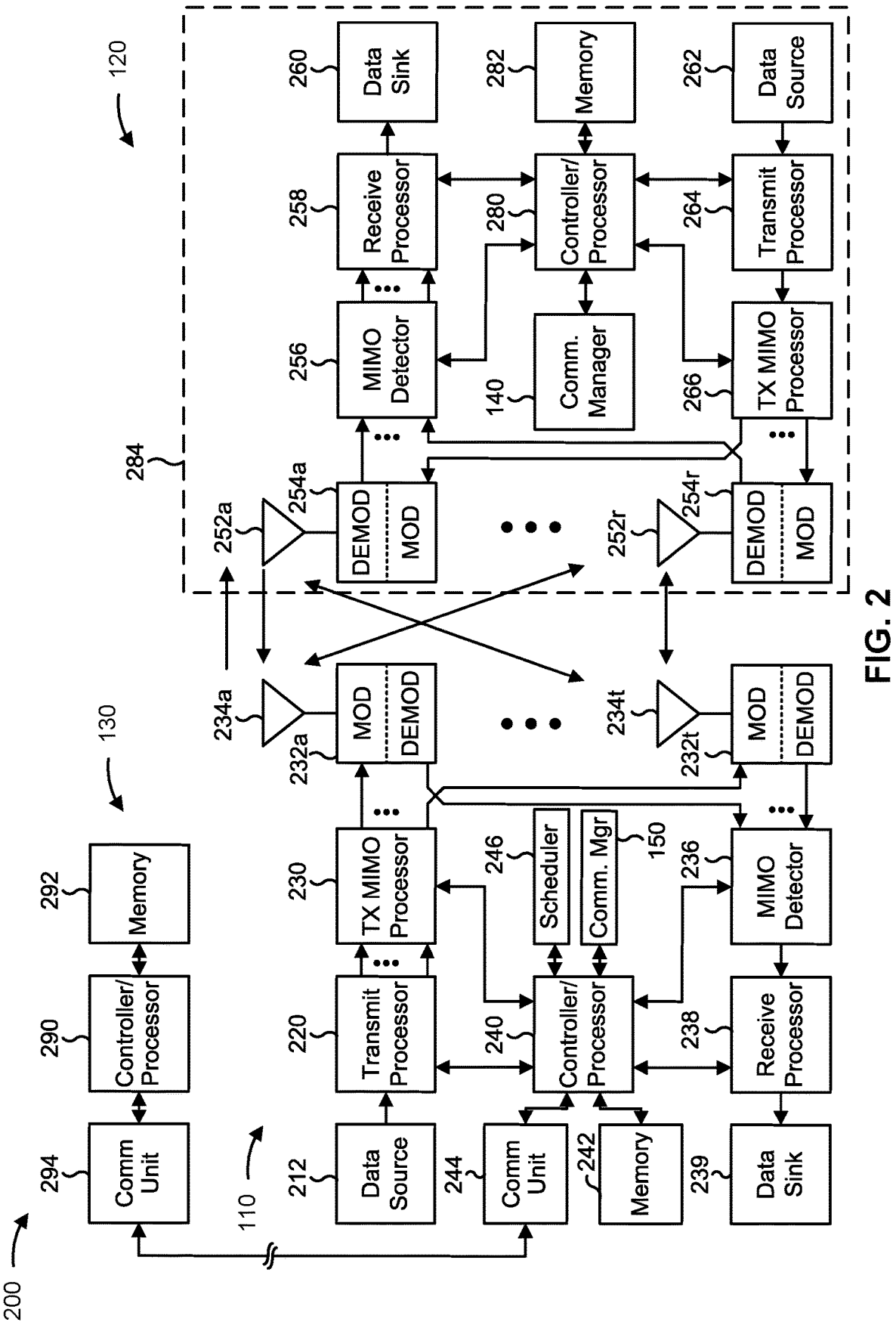
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with a CSF report for FDRSB impairments, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for transmitting, to a network node, a CSF report indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment; means for receiving, from the network node and in association with transmitting the CSF report, an indication that the first MCS is to be used for the first one or more frequency domain resources and that the second MCS is to be used for the second one or more frequency domain resources; and/or means for receiving, from the network node, one or more signals, associated with the frequency domain resource allocation, using the first MCS to decode the first one or more frequency domain resources and using the second MCS to decode the second one or more frequency domain resources. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment; means for transmitting, in association with receiving the CSF report, an indication that the first MCS is to be used by the UE for the first one or more frequency domain resources and that the second MCS is to be used by the UE for the second one or more frequency domain resources; and/or means for transmitting one or more signals, associated with the frequency domain resource allocation, using the first MCS for the first one or more frequency domain resources and using the second MCS for the second one or more frequency domain resources. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

As used herein, the network node 110 "outputting" or "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (e.g., triggering transmission of a physical layer reference signal). Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" a communication may refer to receiving a transmission carrying the communication directly (for example, from the UE 120 to the network node 110) or receiving the communication (or information derived from reception of the communication) via one or more other network nodes or devices.

Figure 3:
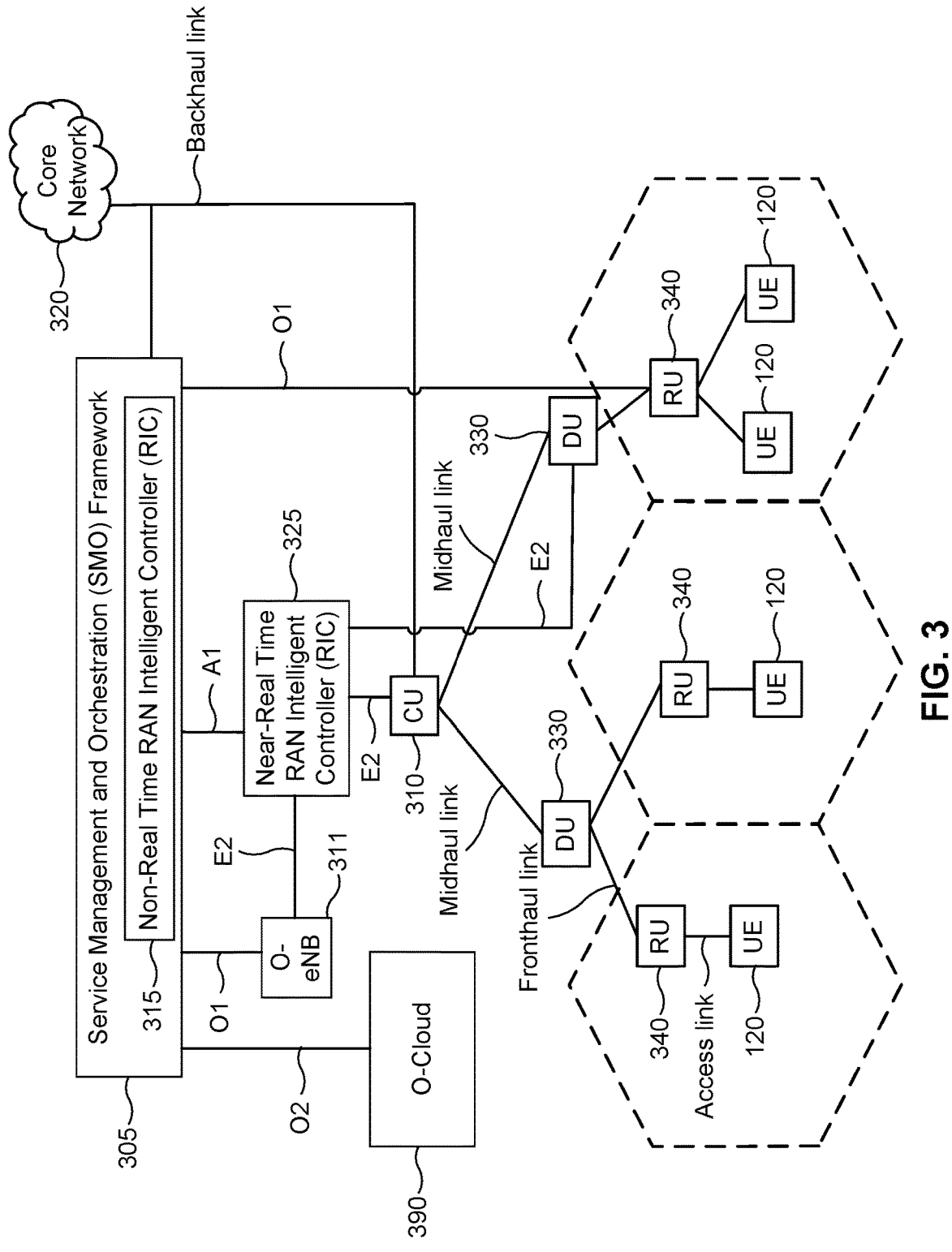
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
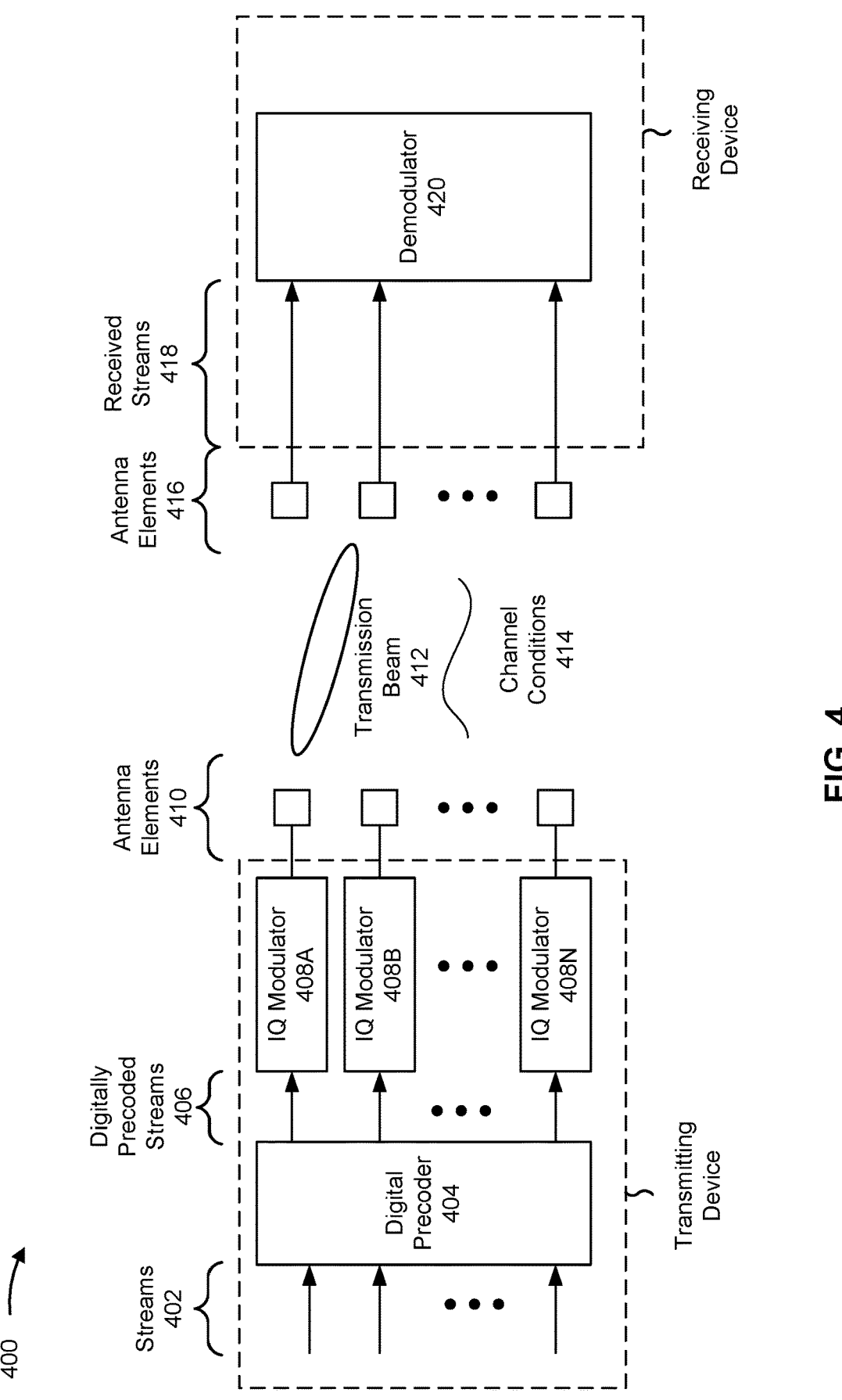
FIG. 4 is a diagram illustrating an example of a communication having a frequency dependent residual side band (FDRSB) impairment, in accordance with the present disclosure.

FIG. 4 is a diagram illustrating an example 400 of a communication having an FDRSB impairment, in accordance with the present disclosure. An FDRSB impairment may be referred to herein as an FDRSB, FDRSB interference, an FDRSB error, an in-phase/quadrature (IQ) mismatch, and/or a frequency-dependent IQ mismatch, among other examples. As shown in FIG. 4, a transmitting device may transmit a communication to a receiving device. The transmitting device may use multiple antenna elements (also referred to as "antennas") to transmit the communication using beamforming. The communication may include signals transmitted via multiple time-frequency resources (e.g., via multiple subcarriers and/or resource blocks on one or more symbols and/or slots).

As shown in FIG. 4, the transmitting device may receive multiple streams 402 for transmission to the receiving device. The streams may include data and/or control signaling for transmission to the receiving device. A digital precoder 404 may receive the streams 402 and apply precoding to the streams 402. After applying the precoding to the streams 402, the digital precoder 404 may output digitally precoded streams 406.

A set of in-phase IQ modulators 408 (e.g., IQ modulators 408A through IQ modulators 408N) may receive the digitally precoded streams 406 from the digital precoder 404 (e.g., directly or indirectly). The IQ modulators 408 may modulate the digitally precoded streams 406 to map bits of the digitally precoded streams 406 to constellation points associated with bit values of the digitally precoded streams 406. For example, the IQ modulators 408 may apply modulation based at least in part on applying amplitudes, in a Q (quadrature) dimension and an I (in-phase) dimension in an IQ plane, according to an MCS of communications to the receiving device. However, the IQ modulators 408 may cause FDRSB (e.g., an IQ mismatch, an FDRSB impairment, and/or FDRSB error) to the digital precoded streams 406 based at least in part on, for example, imperfections of the IQ modulators 408.

For example, the IQ modulators 408 may be used to conserve bandwidth for a given data rate by modulating two orthogonal data streams (e.g., an in-phase (I) data stream and a quadrature (Q) data stream) onto a common carrier. If the phases and amplitudes for both data streams were to match, then one of the sidebands would be completely cancelled out. In practice, however, complete cancelation is rarely accomplished because IQ modulators 408 typically have a mismatch with respect to amplitude and/or phase between the I and Q branches, which results in an FDRSB impairment at the output from each IQ modulator. For example, an FDRSB (sometimes called an IQ mismatch or frequency-dependent IQ mismatch) is an inherent impairment in an IQ modulator 408, and generally corresponds to a signal self-image caused by an IQ imbalance in an IQ modulator. The FDRSB may be a signal that generally has a smaller amplitude than a desired signal, appearing at a negative of a frequency of a desired signal. For example, a first signal that is allocated at subcarrier fi relative to a carrier frequency $f_c$ is subject to an FDRSB impairment by a second signal allocated at a mirror frequency -fi, and vice versa. As used herein, a "mirrored frequency" or "mirrored frequency domain resources" of a frequency f may refer to the frequency -f with respect to the carrier frequency. In general, the characteristics of the FDRSB may vary depending on one or more factors or parameters, such as the distance of the FDRSB from an LO frequency, a frequency band used for communication, a gain state, and/or a thermal state of the IQ modulator, among other examples.

This FDRSB may cause signaling on a first subcarrier to interfere with a second subcarrier that is a mirror of the first subcarrier about a carrier frequency (e.g., with respect to the carrier frequency). For example, the first subcarrier may be a distance from the carrier frequency in a positive direction (e.g., above the carrier frequency), and the second subcarrier may be the same distance from the carrier frequency in a negative direction (e.g., below the carrier frequency).

The IQ modulators 408 may provide modulated signals associated with the digitally precoded streams 406 to antenna elements 410 for transmission over the air to the receiving device. Based at least in part on digital precoding, the antenna elements 410 may transmit the modulated signals associated with the digitally precoded streams 406 via a transmission beam 412. In some examples, the antenna elements 410 may transmit the modulated signals via one or more transmission beams 412. As the modulated signals propagate over the air to the receiving device, channel conditions 414 may affect the modulated signals. For example, the channel conditions 414 may affect a signal-to-noise ratio (SNR) and/or a signal-to-interference-plus-noise ratio (SINR) of the modulated signals as received at the receiving device.

The receiving device may receive the modulated signals having effects from channel conditions 414. Additionally, based at least in part on transmission using the IQ modulators 408, the modulated signals may have FDRSB. The antenna elements 416 may provide received streams 418 (e.g., the modulated signals having effects of channel conditions 414 and FDRSB) to a demodulator 420. In some examples, the demodulator 420 may be unable to correctly demodulate the received streams 418 based at least in part on the FDRSB associated with the IQ modulators 408. In these examples, the receiving device and the transmitting device may consume power, processing resources, and/or communication resources to detect and correct demodulation errors or failures in the received streams 418. For example, the receiving device may provide hybrid automatic repeat request acknowledgment (HARQ-ACK) feedback to indicate a demodulation and/or decoding error, which may trigger a retransmission of communications associated with the streams 402.

Accordingly, because an FDRSB is an undesired output from an IQ modulator 408 that can increase bit errors or otherwise limit link performance in a wireless network, it is desirable for the FDRSB impairment to be mitigated (e.g., for the FDRSB to be cancelled out). For example, in some cases, a network node may be equipped with dedicated hardware in each IQ modulator lane to cancel the corresponding FDRSB, where the dedicated hardware may include an RF demodulator feedback chain coupled to the output from an IQ modulator, an ADC to sample the output from the IQ modulator via the RF demodulator feedback chain, and one or more components to perform digital FDRSB estimation and cancelation (e.g., estimating a phase difference and/or an amplitude difference, and compensating for the phase difference and/or amplitude difference in an imperfectly mixed information signal). However, as wireless networks have progressed to support higher modulation orders (e.g., 1K quadrature amplitude modulation (QAM), 4K QAM, or 16K QAM) and/or to support mmW communications and expand into sub-terahertz (sub-THz) communications and beyond, the network node could potentially use many antennas that are fed by many IQ modulators 408 in order to achieve a sufficiently narrow beamwidth (or high beamforming gain) to compensate for the path loss that occurs due to the high carrier frequency. As a result, the need for many antennas that are fed by numerous IQ chains may significantly increase the cost and complexity associated with burdening the network node with estimating and cancelling numerous FDRSB parameters across the numerous IQ modulator lanes (e.g., because each IQ modulator lane would need to be equipped with dedicated hardware to estimate and cancel the FDRSB in the respective IQ modulator lane). Further, when using the higher order modulations (e.g., 1K QAM, 4K QAM, and/or 16K QAM), if the FDRSB impairment is not mitigated or cancelled, the FDRSB impairment may become a limiting noise floor of communications between a UE and a network node, resulting in the UE being unable to correctly demodulate received communications associated with the FDRSB impairment.

Some techniques and apparatuses described herein are associated with a CSF report for FDRSB impairments. For example, in some cases, a frequency domain allocation (e.g., a bandwidth) of a UE may be an asymmetric allocation with respect to a carrier frequency. Therefore, some frequency domain resources (e.g., subcarriers) within the allocation may be associated with an FDRSB impairment (e.g., because they have a mirrored frequency in the allocation) and other frequency domain resources (e.g., subcarriers) within the allocation may not be associated with an FDRSB impairment (e.g., because they do not have a mirrored frequency in the allocation).

Therefore, a UE may transmit, and a network node may receive, an indication (e.g., in a CSF report) of a first MCS to be (e.g., requested to be) associated with frequency domain resources within an allocation (e.g., a bandwidth) that are associated with an FDRSB impairment and a second MCS to be (e.g., requested to be) associated with frequency domain resources within the allocation (e.g., the bandwidth) that are not associated with an FDRSB impairment. The UE may be configured (e.g., by the network node) to use the first MCS (e.g., for a first one or more frequency domain resources within the bandwidth) and to use the second MCS (e.g., for a second one or more frequency domain resources within the bandwidth). The network node may transmit, and the UE may receive, signals associated with the first one or more frequency domain resources using the first MCS and signals associated with the second one or more frequency domain resources using the second MCS.

As a result, the UE and/or the network node may be enabled to use a higher order MCS for frequency domain resources that are not associated with an FDRSB impairment, and to use a lower order MCS for frequency domain resources that are associated with an FDRSB impairment. Enabling the UE and the network node to use the higher order MCS for a portion of the frequency domain allocation that is not associated with an FDRSB impairment improves spectral efficiency, improves a transmission rate, and/or reduces an error rate of communications, among other examples. Additionally, enabling the UE and the network node to use a lower order MCS for a portion of the frequency domain allocation that is associated with an FDRSB impairment improves a likelihood that the network node is able to mitigate the FDRSB impairment (e.g., to cancel the FDRSB). As a result, signals that are transmitted and/or received via the frequency domain allocation are associated with a higher spectral efficiency, a higher transmission rate, and/or a reduced error rate, among other examples, while also not degrading the reliability of a demodulation of signals communicated via the frequency domain allocation.

As indicated above, FIG. 4 is provided as an example. Other examples may differ from what is described with regard to FIG. 4.

Figure 5:
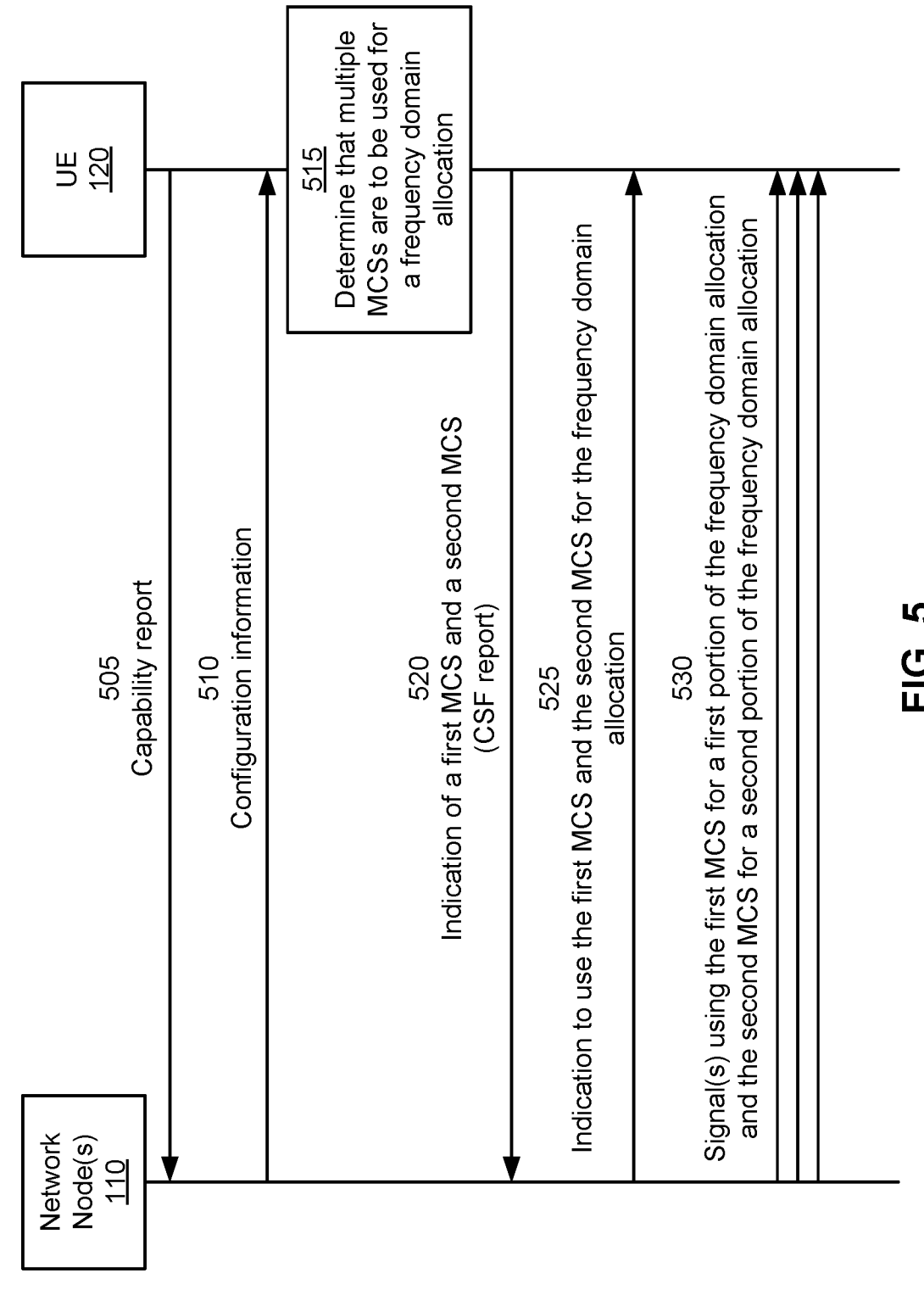
FIG. 5 is a diagram of an example associated with a channel state feedback report for FDRSB impairments, in accordance with the present disclosure.

FIG. 5 is a diagram of an example 500 associated with a CSF report for FDRSB impairments, in accordance with the present disclosure. As shown in FIG. 5, one or more network nodes 110 (e.g., a base station, a CU, a DU, and/or an RU) may communicate with a UE 120. In some aspects, the network node 110 and the UE 120 may be part of a wireless network (e.g., the wireless network 100). The UE 120 and the network node 110 may have established a wireless connection prior to operations shown in FIG. 5. In some aspects, the network node 110 may include IQ modulators for transmitting modulated signals to the UE 120. The IQ modulators may cause FDRSB in transmitted signals, as explained in more detail elsewhere herein.

As used herein, "frequency domain resources" may refer to frequency resources in a wireless network, such as a subcarrier, a resource block, and/or a bandwidth part (BWP), among other examples. For example, time-frequency resources in a radio access network may be partitioned into resource blocks (RBs). An RB is sometimes referred to as a physical resource block (PRB). An RB includes a set of subcarriers (e.g., 12 subcarriers) and a set of symbols (e.g., 14 symbols) that are schedulable by a network node 110 as a unit. In some aspects, an RB may include a set of subcarriers in a single slot. For example, a single time-frequency resource included in an RB may be referred to as a resource element (RE). An RE may include a single subcarrier (e.g., in frequency) and a single symbol (e.g., in time). A symbol may be referred to as an orthogonal frequency division multiplexing (OFDM) symbol. An RE may be used to transmit one modulated symbol, which may be a real value or a complex value.

As shown by reference number 505, the UE 120 may transmit, and the network node 110 may receive, a capability report. The capability report may indicate UE support for one or more operations and/or actions described herein. The UE 120 may transmit the capability report via UE capability signaling, a UE assistance information (UAI) communication, RRC signaling, a physical uplink shared channel (PUSCH), and/or a physical uplink control channel (PUCCH), among other examples.

In some aspects, the capability report may indicate that the UE 120 supports transmitting an indication of different MCSs to be used for frequency domain resources that are and/or that are not associated with an FDRSB impairment. For example, the capability report may indicate that the UE 120 supports transmitting a CSF report that indicates a first MCS (e.g., a first requested or recommended MCS) for frequency domain resources that are associated with an FDRSB impairment and a second MCS (e.g., a second requested or recommended MCS) for frequency domain resources that are not associated with an FDRSB impairment.

In some aspects, the capability report may indicate that the UE 120 supports receiving signals via the same frequency domain allocation (e.g., the same bandwidth) using different (e.g., multiple) MCSs. "Frequency domain allocation" and "frequency domain resource allocation" may be used interchangeably herein. In some aspects, the capability report may indicate that the UE 120 supports using a first MCS for a first portion of a bandwidth and a second MCS for a second portion of the bandwidth. In other words, the capability report may indicate that the UE 120 supports being configured with multiple MCSs for the same bandwidth and/or the same frequency domain allocation.

In some aspects, the capability report may indicate that the UE 120 does not support an FDRSB cancelation capability. For example, some UEs may be capable of performing FDRSB estimation and cancelation. However, UEs generally lack universal support for FDRSB cancelation (e.g., some UEs may have a capability to correct an FDRSB image that interferes with a desired signal, and other UEs may be incapable of correcting an FDRSB image that interferes with a desired signal). The capability report may indicate that the UE 120 is incapable of correcting and/or cancelling an FDRSB.

As shown by reference number 510, the network node 110 may transmit, and the UE 120 may receive, configuration information. In some aspects, the UE 120 may receive the configuration information via one or more of RRC signaling, one or more MAC control elements (MAC-CEs), and/or downlink control information (DCI), among other examples. In some aspects, the configuration information may include an indication of one or more configuration parameters for selection by the UE 120, and/or explicit configuration information for the UE 120 to use to configure itself, among other examples.

In some aspects, the configuration information may indicate that the UE 120 is to transmit (e.g., is to report) a first MCS to be used for portions of a frequency domain allocation (e.g., a bandwidth) that are associated with an FDRSB impairment and a second MCS to be used for portions of the frequency domain allocation (e.g., the bandwidth) that are not associated with an FDRSB impairment. For example, the configuration information may indicate that the UE 120 is to transmit a CSF report indicating a first recommended MCS for portions of a frequency domain allocation that are associated with an FDRSB impairment and indicating a second recommended MCS for portions of the frequency domain allocation that are not associated with an FDRSB impairment.

In some aspects, the configuration information may indicate that the UE 120 is to transmit (e.g., is to report) the recommended MCSs when the UE 120 is configured with, or otherwise receives an indication of, an asymmetric frequency domain allocation with respect to a carrier frequency. As used herein, an "asymmetric" frequency domain allocation may refer to a frequency domain allocation that includes a greater amount of frequency domain resources on one side of a carrier frequency (e.g., above or below the carrier frequency in the frequency domain). As an example, a frequency domain allocation (e.g., a bandwidth) of 50 MHz that includes 20 MHz above the carrier frequency and 30 MHz below the carrier frequency may be considered an asymmetric frequency domain allocation. As another example, a frequency domain allocation (e.g., a bandwidth) of 50 MHz that includes 25 MHz above the carrier frequency and 25 MHz below the carrier frequency may not be considered an asymmetric frequency domain allocation (e.g., may be considered a symmetric frequency domain allocation). For example, using two (or more) MCSs for a frequency domain allocation may only be useful for asymmetric frequency domain allocations, because for symmetric frequency domain allocations the entire frequency domain allocation may experience an FDRSB impairment. Therefore, using multiple MCSs for symmetric frequency domain allocations may not be beneficial.

In some aspects, the configuration information may indicate a set of candidate MCSs available when multiple MCSs are used for the same frequency domain allocation. For example, the configuration information may indicate a set of MCSs from which the UE 120 can select to recommend a first MCS for portions of a frequency domain allocation that are associated with an FDRSB impairment and a second MCS for portions of the frequency domain allocation that are not associated with an FDRSB impairment. In some aspects, the configuration information may indicate a set of candidate MCSs available for use for portions of a frequency domain allocation that are associated with an FDRSB impairment (e.g., to ensure that an MCS is used for these frequency domain resources that enables the network node 110 to mitigate or cancel an FDRSB).

In some aspects, the configuration information may indicate that the UE 120 is to transmit (e.g., is to report) the recommended MCSs when the UE 120 detects that an FDRSB interference level is a dominant factor of a noise floor of a channel. In other words, the configuration information may indicate that the UE 120 is to transmit (e.g., is to report) the recommended MCSs based on, in response to, or otherwise associated with the UE 120 detecting that a difference between a first noise level associated with the FDRSB impairment and a second noise level associated with thermal noise satisfies a threshold. For example, the configuration information may indicate that the UE 120 is to transmit (e.g., is to report) the recommended MCSs based on, in response to, or otherwise associated with an FDRSB noise floor being dominant over the thermal noise.

The UE 120 may configure itself based at least in part on the configuration information. In some aspects, the UE 120 may be configured to perform one or more operations described herein based at least in part on the configuration information.

As shown by reference number 515, the UE 120 may determine that multiple MCSs are to be used for a frequency domain allocation (e.g., for a bandwidth). For example, the UE 120 may determine that the frequency domain allocation is an asymmetric frequency domain allocation with respect to a carrier frequency. In some aspects, the UE 120 may determine that multiple MCSs are to be used for a frequency domain allocation based on a comparison of a first signal-to-noise ratio (SNR) associated with a first portion of the frequency domain allocation and a second SNR of a second portion of the frequency domain allocation. For example, the UE 120 may determine that a difference between the first SNR and the second SNR satisfies an SNR threshold. This may indicate that a portion of the frequency domain allocation (e.g., the portion associated with a lower SNR) may be experiencing an FDRSB impairment.

In some aspects, the UE 120 may determine that multiple MCSs are to be used for a frequency domain allocation based on detecting that a portion of the frequency domain allocation is experiencing an FDRSB impairment and that the UE 120 does not support an FDRSB cancelation capability. For example, if the UE 120 does support the FDRSB cancelation capability, then the UE 120 may simply perform FDRSB cancelation to mitigate the effects of the FDRSB impairment. However, if the UE 120 is not capable of performing FDRSB cancelation, then the UE 120 may determine that multiple MCSs are to be used for a frequency domain allocation associated with an FDRSB impairment.

In some aspects, the UE 120 may determine that multiple MCSs are to be used for a frequency domain allocation based on detecting that an FDRSB noise or interference level is dominant. For example, the UE 120 may determine that multiple MCSs are to be used for a frequency domain allocation based on, in response to, or otherwise associated with a comparison of a first noise level associated with the FDRSB impairment and a second noise level associated with thermal noise. For example, the UE 120 may determine that multiple MCSs are to be used for a frequency domain allocation based on, in response to, or otherwise associated with a difference between the first noise level and the second noise level satisfying a threshold.

In some aspects, the UE 120 may determine a first MCS associated with a first one or more frequency domain resources (e.g., a first portion) of the frequency domain allocation and a second MCS associated with a second one or more frequency domain resources (e.g., a second portion) of the frequency domain allocation. For example, the first one or more frequency domain resources (e.g., the first portion) may be associated with an FDRSB impairment. The second one or more frequency domain resources may not be associated with an FDRSB impairment. The UE 120 may determine a first MCS to be used for frequency domain resources (e.g., the first one or more frequency domain resources) that are associated with an FDRSB impairment and a second MCS to be used for frequency domain resources (e.g., the second one or more frequency domain resources) that are not associated with an FDRSB impairment. In some aspects, the UE 120 may determine or select the first MCS and/or the second MCS based on, or otherwise associated with, a capability of the UE 120. For example, the UE 120 may select a highest order MCS supported by the UE 120 for the frequency domain resources (e.g., the second one or more frequency domain resources) that are not associated with an FDRSB impairment (e.g., to improve spectral efficiency and/or reliability). The UE 120 may select an MCS that enables the network node 110 to perform FDRSB cancelation for the frequency domain resources (e.g., the first one or more frequency domain resources) that are associated with an FDRSB impairment.

The UE 120 may identify the first one or more frequency domain resources and the second one or more frequency domain resources based on, or otherwise associated with, a comparison of SNRs over the frequency domain allocation (e.g., portions associated with a lower SNR may be associated with an FDRSB impairment, and portions associated with higher SNR may not be associated with an FDRSB impairment). As another example, the UE 120 may identify the first one or more frequency domain resources and the second one or more frequency domain resources based on, or otherwise associated with, frequency domain resources having a mirrored frequency within the frequency domain allocation. For example, if the frequency domain allocation is 50 MHz and includes 30 MHz above a carrier frequency and 20 MHz below the carrier frequency, then the UE 120 may identify that the frequency domain resources (e.g., the first one or more frequency domain resources) that are associated with an FDRSB impairment include frequencies from +20 MHz to −20 MHz (e.g., with respect to the carrier frequency) because these frequencies are associated with mirrored frequencies (e.g., +20 MHz and −20 MHz are mirrored frequencies, +18 MHz and −18 MHz are mirrored frequencies, and so on). The UE 120 may identify that the frequency domain resources (e.g., the second one or more frequency domain resources) that are not associated with an FDRSB impairment include the frequencies from +21 MHz to +30 MHz (e.g., because these frequencies are not associated with a mirrored frequency).

As shown by reference number 520, the UE 120 may transmit, and the network node 110 may receive, an indication of a first MCS and a second MCS for a frequency domain allocation (e.g., a bandwidth) of the UE 120. For example, the UE 120 may request or recommend that the first MCS and the second MCS be used for the frequency domain allocation. In some aspects, the UE 120 may transmit a CSF report indicating the first MCS and the second MCS. Although the CSF report is described herein as including the indication of the first MCS and the second MCS, in other examples the UE 120 may use a different report or different signaling to indicate the first MCS and the second MCS, such as a channel state information (CSI) report, a UE capability report (for example, as described in connection with reference number 505), an RRC communication, and/or uplink control information (UCI) signaling, among other examples.

A CSF report may be a communication that includes information associated with radio channel quality. For example, the CSF report may include information associated with a signal strength, an RSRP, a signal quality, an SNR, and/or other parameters associated with a quality of the radio channel. A CSF report may be used by the network node 110 to adapt transmission parameters, such as an MCS, beamforming, and/or power control, among other examples, in response to the radio channel information indicated in the CSF report. This enables the network node 110 to adapt the transmission parameters in real time in response to changing channel conditions.

In some aspects, the CSF report may include one or more fields to indicate information associated with an FDRSB. For example, the CSF report may include a field to indicate a recommended MCS (e.g., in which the UE 120 indicates the first MCS) for frequency domain resources (e.g., subcarriers) that are associated with an FDRSB impairment. As another example, the CSF report may include a field to indicate a recommended MCS (e.g., in which the UE 120 indicates the second MCS) for frequency domain resources (e.g., subcarriers) that are not associated with an FDRSB impairment. In some aspects, the CSF report may include a field associated with indicating the FDRSB cancelation capability of the UE 120. For example, the CSF report may include an indication that the UE 120 does not support an FDRSB cancelation capability.

In some aspects, the CSF report may include an indication of the first one or more frequency domain resources and the second one or more frequency domain resources (e.g., described above) included in the frequency domain resource allocation. In other examples, the CSF report may not include an indication of the first one or more frequency domain resources and the second one or more frequency domain resources. In such examples, the UE 120 may simply indicate (e.g., in the CSF report) that the first MCS is recommended be used for frequency domain resources associated with an FDRSB impairment and that the second MCS is recommended to be used for frequency domain resources that are not associated with an FDRSB impairment. The UE 120 and/or the network node 110 may identify the first one or more frequency domain resources and the second one or more frequency domain resources in a similar manner as described elsewhere herein (e.g., based on an SNR across the frequency domain allocation and/or on identifying mirrored frequencies within the frequency domain allocation).

As shown by reference number 525, the network node 110 may transmit, and the UE 120 may receive, an indication that the first MCS is to be used for FDRSB impacted frequency resources (e.g., for the first one or more frequency domain resources) and that the second MCS is to be used for non-FDRSB impacted resources (e.g., for the second one or more frequency domain resources). For example, the UE 120 may be configured to use the first MCS and the second MCS based on, in response to, or otherwise associated with transmitting the CSF report. For example, the indication that the first MCS is to be used for FDRSB impacted frequency resources and that the second MCS is to be used for non-FDRSB impacted resources may be included in an RRC communication, a MAC-CE communication, and/or a DCI communication, among other examples. For example, the UE 120 may receive a physical downlink control channel (PDCCH) communication indicating that multiple MCSs are configured for respective subcarrier portions of the frequency domain allocation (e.g., the bandwidth) of the UE 120.

For example, the network node 110 may receive the CSF report. The network node 110 may determine that the UE 120 should be configured with multiple MCSs for a frequency domain allocation (e.g., a bandwidth) based on, in response to, or otherwise associated with receiving the CSF report. For example, the network node 110 may determine that the UE 120 should be configured with multiple MCSs for a frequency domain allocation (e.g., a bandwidth) based on, in response to, or otherwise associated with the CSF report indicating multiple recommended MCSs and indicating that the UE 120 does not support an FDRSB cancelation capability. The network node 110 may determine whether the recommended MCSs indicated in the CSF report can be configured for the UE 120 (e.g., based on a UE capability and/or a capability of the network node). The network node 110 may configure the UE 120 to use the first MCS and the second MCS for the frequency domain allocation based on, in response to, or otherwise associated with determining that the recommended MCSs indicated in the CSF report can be configured for the UE 120.

As shown by reference number 530, the network node 110 may transmit, and the UE 120 may receive, one or more signals, associated with the frequency domain resource allocation, using the first MCS to decode the first one or more frequency domain resources and using the second MCS to decode the second one or more frequency domain resources. For example, the network node 110 may transmit, and the UE 120 may receive, a first signal using the first MCS via the first one or more frequency domain resources (e.g., a first one or more subcarriers) of the frequency domain allocation of the UE 120. Additionally, or alternatively, the network node 110 may transmit, and the UE 120 may receive, a second signal using the second MCS via the second one or more frequency domain resources (e.g., a second one or more subcarriers) of the frequency domain allocation of the UE 120.

For example, the UE 120 may receive using a first one or more receiving operations, and the network node 110 may transmit using a first one or more transmitting operations, signals associated with the first one or more frequency domain resources (e.g., a first subcarrier region of the bandwidth of the UE 120), such as a first network slicing operation, a first log likelihood ratio (LLR) generator, and/or a first code rate, among other examples. The UE 120 may receive using a second one or more receiving operations, and the network node 110 may transmit using a second one or more transmitting operations, signals associated with the second one or more frequency domain resources (e.g., a second subcarrier region of the bandwidth of the UE 120), such as a second network slicing operation, a second LLR generator, and/or a second code rate, among other examples. For example, the UE 120 may decode and/or demodulate signals in the first one or more frequency domain resources using the first MCS. The UE 120 may decode and/or demodulate signals in the second one or more frequency domain resources using the second MCS.

In other words, the UE 120 may receive data and/or control communications via the frequency domain allocation using an MCS corresponding to a subcarrier region of the frequency domain allocation in which the data and/or control communications are communicated. Therefore, in subcarrier regions of the frequency domain allocation that are not impacted by an FDRSB, the UE 120 and the network node 110 may communicate using a higher order MCS (e.g., 1K QAM, 4K QAM, or 16K QAM) to improve a spectral efficiency, reliability, and/or transmission rate, among other examples of the communications in the subcarrier regions of the frequency domain allocation that are not impacted by an FDRSB. In subcarrier regions of the frequency domain allocation that are not impacted by an FDRSB, the UE 120 and the network node 110 may communicate using a lower order MCS (e.g., 256 QAM) to ensure that the network node 110 is able to mitigate the effects of the FDRSB and reduce a likelihood of demodulation errors at the UE 120 for communications in the subcarrier regions of the frequency domain allocation that are impacted by an FDRSB. This ensures a higher spectral efficiency and higher transmission rate without degrading the reliability of the demodulation.

As indicated above, FIG. 5 is provided as an example. Other examples may differ from what is described with respect to FIG. 5.

Figure 6:
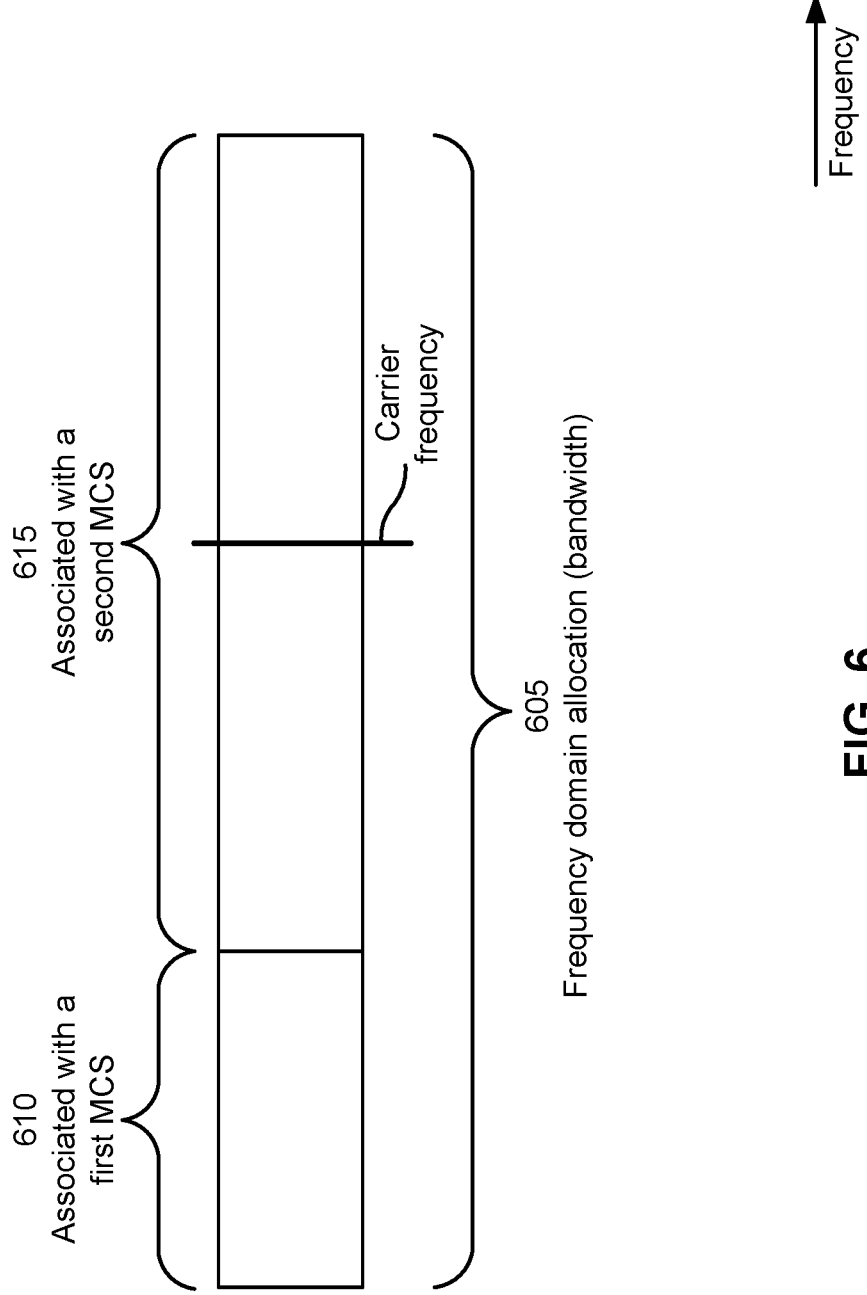
FIG. 6 is a diagram of an example associated with a resource allocation associated with multiple modulation and coding schemes to mitigate FDRSB impairments, in accordance with the present disclosure.

FIG. 6 is a diagram of an example 600 associated with a resource allocation associated with multiple MCSs to mitigate FDRSB impairments, in accordance with the present disclosure. As shown in FIG. 6, a UE 120 may be configured with, or otherwise receives an indication of, a frequency domain allocation 605 (e.g., a bandwidth).

The frequency domain allocation 605 may be associated with a carrier frequency ($f_c$). As shown in FIG. 6, the frequency domain allocation 605 may be asymmetric with respect to the carrier frequency. For example, the frequency domain allocation 605 may include a larger portion of frequency domain resources below the carrier frequency (e.g., to the left of the carrier frequency as shown in FIG. 6) than a portion of frequency domain resources above the carrier frequency (e.g., to the right of the carrier frequency as shown in FIG. 6).

As described in more detail elsewhere herein, the UE 120 may be configured to use multiple MCSs for the frequency domain allocation 605 to mitigate an impact of an FDRSB impairment while also improving spectral efficiency and a transmission rate. For example, as shown by reference number 610, a first portion (e.g., a first one or more subcarriers) of the frequency domain allocation 605 may be associated with a first MCS. As shown by reference number 615, a second portion (e.g., a second one or more subcarriers) of the frequency domain allocation 605 may be associated with a second MCS. The first portion of the frequency domain allocation 605 may be associated with a higher order MCS because the first portion may not be associated with an FDRSB impairment (e.g., because the frequency domain allocation 605 does not include any mirrored frequency resources for the first portion with respect to the carrier frequency). The second portion of the frequency domain allocation 605 may be associated with a lower order MCS because the second portion may be associated with an FDRSB impairment (e.g., because the frequency domain allocation 605 does include mirrored frequency resources for the second portion with respect to the carrier frequency).

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120) performs operations associated with a CSF report for FDRSB impairments.

As shown in FIG. 7, in some aspects, process 700 may include transmitting, to a network node, a CSF report indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment (block 710). For example, the UE (e.g., using transmission component 904 and/or communication manager 906, depicted in FIG. 9) may transmit, to a network node, a CSF report indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment, as described above.

As further shown in FIG. 7, in some aspects, process 700 may include receiving, from the network node and in association with transmitting the CSF report, an indication that the first MCS is to be used for the first one or more frequency domain resources and that the second MCS is to be used for the second one or more frequency domain resources (block 720). For example, the UE (e.g., using reception component 902 and/or communication manager 906, depicted in FIG. 9) may receive, from the network node and in association with transmitting the CSF report, an indication that the first MCS is to be used for the first one or more frequency domain resources and that the second MCS is to be used for the second one or more frequency domain resources, as described above.

As further shown in FIG. 7, in some aspects, process 700 may include receiving, from the network node, one or more signals, associated with the frequency domain resource allocation, using the first MCS to decode the first one or more frequency domain resources and using the second MCS to decode the second one or more frequency domain resources (block 730). For example, the UE (e.g., using reception component 902 and/or communication manager 906, depicted in FIG. 9) may receive, from the network node, one or more signals, associated with the frequency domain resource allocation, using the first MCS to decode the first one or more frequency domain resources and using the second MCS to decode the second one or more frequency domain resources, as described above.

Process 700 may include additional aspects, such as any single aspect or any combination of aspects described below and/or in connection with one or more other processes described elsewhere herein.

In a first aspect, the CSF report further indicates that the UE does not have an FDRSB cancellation capability, and receiving the indication that the first MCS is to be used for the first one or more frequency domain resources and that the second MCS is to be used for the second one or more frequency domain resources is associated with the CSF report indicating that the UE does not have the FDRSB cancellation capability.

In a second aspect, alone or in combination with the first aspect, the first one or more frequency domain resources are associated with mirrored frequency domain resources with respect to a carrier frequency of the frequency domain resource allocation, and the second one or more frequency domain resources are not associated with mirrored frequency domain resources with respect to the carrier frequency.

In a third aspect, alone or in combination with one or more of the first and second aspects, the frequency domain resource allocation is an asymmetric frequency domain resource allocation with respect to a carrier frequency of the frequency domain resource allocation.

In a fourth aspect, alone or in combination with one or more of the first through third aspects, transmitting the CSF report is associated with a comparison of a first noise level associated with the FDRSB impairment and a second noise level associated with thermal noise.

In a fifth aspect, alone or in combination with one or more of the first through fourth aspects, transmitting the CSF report is associated with a difference between the first noise level and the second noise level satisfying a threshold.

In a sixth aspect, alone or in combination with one or more of the first through fifth aspects, receiving the one or more signals includes receiving the one or more signals via the first one or more frequency domain resources using a first one or more receiving operations, or receiving the one or more signals via the second one or more frequency domain resources using a second one or more receiving operations.

In a seventh aspect, alone or in combination with one or more of the first through sixth aspects, receiving the one or more signals includes receiving the one or more signals via the first one or more frequency domain resources using a first code rate, or receiving the one or more signals via the second one or more frequency domain resources using a second code rate.

In an eighth aspect, alone or in combination with one or more of the first through seventh aspects, the first one or more frequency domain resources include a first one or more subcarriers, and the second one or more frequency domain resources include a second one or more subcarriers.

In a ninth aspect, alone or in combination with one or more of the first through eighth aspects, the frequency domain resource allocation is a bandwidth configured for the UE.

In a tenth aspect, alone or in combination with one or more of the first through ninth aspects, the first MCS is associated with a lower order than the second MCS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with a CSF report for FDRSB impairments.

As shown in FIG. 8, in some aspects, process 800 may include receiving a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment (block 810). For example, the network node (e.g., using reception component 1002 and/or communication manager 1006, depicted in FIG. 10) may receive a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment, as described above.

As further shown in FIG. 8, in some aspects, process 800 may include transmitting, in association with receiving the CSF report, an indication that the first MCS is to be used by the UE for the first one or more frequency domain resources and that the second MCS is to be used by the UE for the second one or more frequency domain resources (block 820). For example, the network node (e.g., using transmission component 1004 and/or communication manager 1006, depicted in FIG. 10) may transmit, in association with receiving the CSF report, an indication that the first MCS is to be used by the UE for the first one or more frequency domain resources and that the second MCS is to be used by the UE for the second one or more frequency domain resources, as described above.

As further shown in FIG. 8, in some aspects, process 800 may include transmitting one or more signals, associated with the frequency domain resource allocation, using the first MCS for the first one or more frequency domain resources and using the second MCS for the second one or more frequency domain resources (block 830). For example, the network node (e.g., using transmission component 1004 and/or communication manager 1006, depicted in FIG. 10) may transmit one or more signals, associated with the frequency domain resource allocation, using the first MCS for the first one or more frequency domain resources and using the second MCS for the second one or more frequency domain resources, as described above.

Process 800 may include additional aspects, such as any single aspect or any combination of aspects described below and/or in connection with one or more other processes described elsewhere herein.

In a first aspect, the CSF report further indicates that the UE does not have an FDRSB cancellation capability, and transmitting the indication that the first MCS is to be used by the UE for the first one or more frequency domain resources and that the second MCS is to be used by the UE for the second one or more frequency domain resources is associated with the CSF report indicating that the UE does not have the FDRSB cancellation capability.

In a second aspect, alone or in combination with the first aspect, the first one or more frequency domain resources are associated with mirrored frequency domain resources with respect to a carrier frequency of the frequency domain resource allocation, and the second one or more frequency domain resources are not associated with mirrored frequency domain resources with respect to the carrier frequency.

In a third aspect, alone or in combination with one or more of the first and second aspects, the frequency domain resource allocation is an asymmetric frequency domain resource allocation with respect to a carrier frequency of the frequency domain resource allocation.

In a fourth aspect, alone or in combination with one or more of the first through third aspects, transmitting the one or more signals includes transmitting the one or more signals via the first one or more frequency domain resources using a first one or more transmitting operations, or transmitting the one or more signals via the second one or more frequency domain resources using a second one or more transmitting operations.

In a fifth aspect, alone or in combination with one or more of the first through fourth aspects, transmitting the one or more signals includes transmitting the one or more signals via the first one or more frequency domain resources using a first code rate, or transmitting the one or more signals via the second one or more frequency domain resources using a second code rate.

In a sixth aspect, alone or in combination with one or more of the first through fifth aspects, the first one or more frequency domain resources include a first one or more subcarriers, and the second one or more frequency domain resources include a second one or more subcarriers.

In a seventh aspect, alone or in combination with one or more of the first through sixth aspects, the frequency domain resource allocation is a bandwidth configured for the UE.

In an eighth aspect, alone or in combination with one or more of the first through seventh aspects, the first MCS is associated with a lower order than the second MCS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
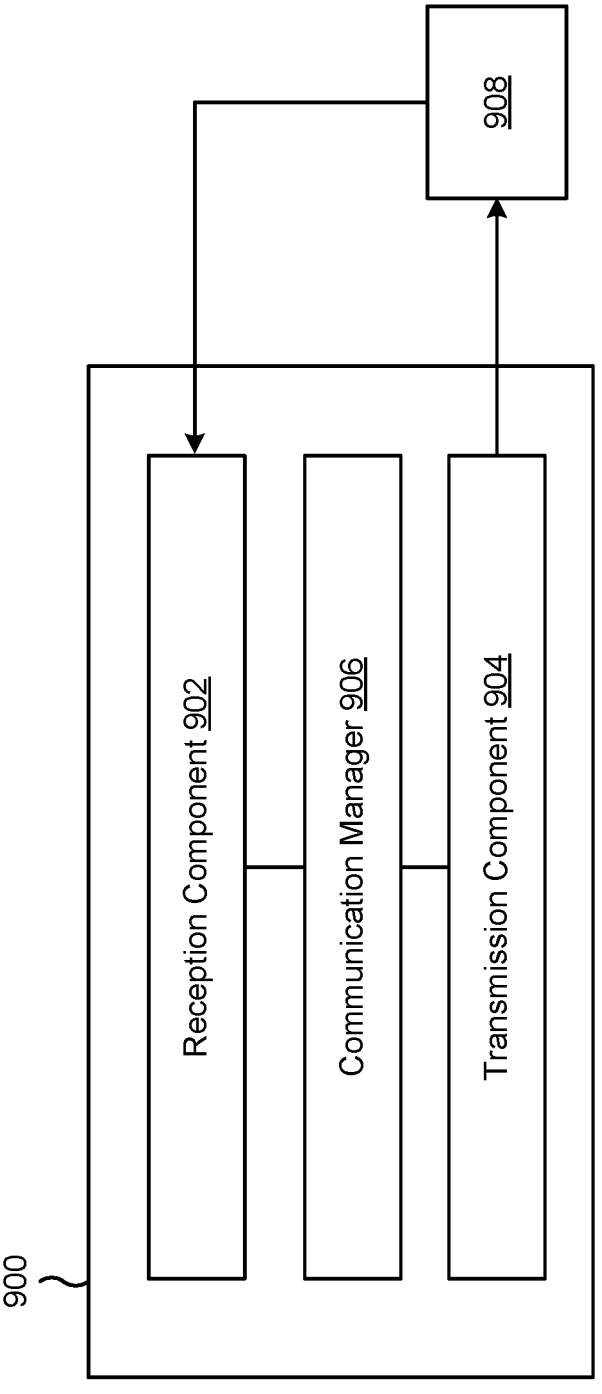
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit, to a network node, a CSF report indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The reception component 902 may receive, from the network node and in association with transmitting the CSF report, an indication that the first MCS is to be used for the first one or more frequency domain resources and that the second MCS is to be used for the second one or more frequency domain resources. The reception component 902 may receive, from the network node, one or more signals, associated with the frequency domain resource allocation, using the first MCS to decode the first one or more frequency domain resources and using the second MCS to decode the second one or more frequency domain resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
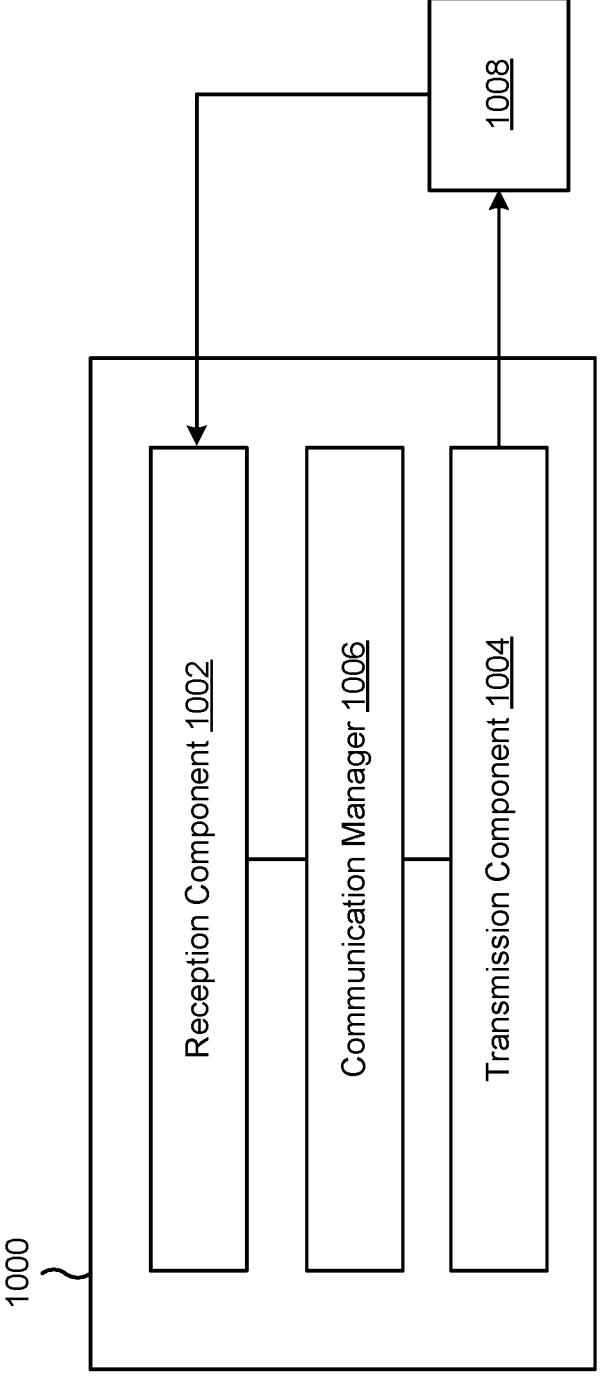
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a CSF report, associated with a UE, indicating a first MCS associated with a first one or more frequency domain resources of a frequency domain resource allocation associated with the UE, and a second MCS associated with a second one or more frequency domain resources of the frequency domain resource allocation, the first one or more frequency domain resources being associated with an FDRSB impairment. The transmission component 1004 may transmit, in association with receiving the CSF report, an indication that the first MCS is to be used by the UE for the first one or more frequency domain resources and that the second MCS is to be used by the UE for the second one or more frequency domain resources. The transmission component 1004 may transmit one or more signals, associated with the frequency domain resource allocation, using the first MCS for the first one or more frequency domain resources and using the second MCS for the second one or more frequency domain resources.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting, to a network node, a channel state feedback (CSF) report indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment; receiving, from the network node and in association with transmitting the CSF report, an indication that the first MCS is to be used for the first one or more frequency domain resources and that the second MCS is to be used for the second one or more frequency domain resources; and receiving, from the network node, one or more signals, associated with the frequency domain resource allocation, using the first MCS to decode the first one or more frequency domain resources and using the second MCS to decode the second one or more frequency domain resources.

Aspect 2: The method of Aspect 1, wherein the CSF report further indicates that the UE does not have an FDRSB cancellation capability, and wherein receiving the indication that the first MCS is to be used for the first one or more frequency domain resources and that the second MCS is to be used for the second one or more frequency domain resources is associated with the CSF report indicating that the UE does not have the FDRSB cancellation capability.

Aspect 3: The method of any of Aspects 1-2, wherein the first one or more frequency domain resources are associated with mirrored frequency domain resources with respect to a carrier frequency of the frequency domain resource allocation, and wherein the second one or more frequency domain resources are not associated with mirrored frequency domain resources with respect to the carrier frequency.

Aspect 4: The method of any of Aspects 1-3, wherein the frequency domain resource allocation is an asymmetric frequency domain resource allocation with respect to a carrier frequency of the frequency domain resource allocation.

Aspect 5: The method of any of Aspects 1-4, wherein transmitting the CSF report is associated with a comparison of a first noise level associated with the FDRSB impairment and a second noise level associated with thermal noise.

Aspect 6: The method of Aspect 5, wherein transmitting the CSF report is associated with a difference between the first noise level and the second noise level satisfying a threshold.

Aspect 7: The method of any of Aspects 1-6, wherein receiving the one or more signals comprises: receiving the one or more signals via the first one or more frequency domain resources using a first one or more receiving operations; or receiving the one or more signals via the second one or more frequency domain resources using a second one or more receiving operations.

Aspect 8: The method of any of Aspects 1-7, wherein receiving the one or more signals comprises: receiving the one or more signals via the first one or more frequency domain resources using a first code rate; or receiving the one or more signals via the second one or more frequency domain resources using a second code rate.

Aspect 9: The method of any of Aspects 1-8, wherein the first one or more frequency domain resources include a first one or more subcarriers, and wherein the second one or more frequency domain resources include a second one or more subcarriers.

Aspect 10: The method of any of Aspects 1-9, wherein the frequency domain resource allocation is a bandwidth configured for the UE.

Aspect 11: The method of any of Aspects 1-10, wherein the first MCS is associated with a lower order than the second MCS.

Aspect 12: A method of wireless communication performed by a network node, comprising: receiving a channel state feedback (CSF) report, associated with a user equipment (UE), indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment; transmitting, in association with receiving the CSF report, an indication that the first MCS is to be used by the UE for the first one or more frequency domain resources and that the second MCS is to be used by the UE for the second one or more frequency domain resources; and transmitting one or more signals, associated with the frequency domain resource allocation, using the first MCS for the first one or more frequency domain resources and using the second MCS for the second one or more frequency domain resources.

Aspect 13: The method of Aspect 12, wherein the CSF report further indicates that the UE does not have an FDRSB cancellation capability, and wherein transmitting the indication that the first MCS is to be used by the UE for the first one or more frequency domain resources and that the second MCS is to be used by the UE for the second one or more frequency domain resources is associated with the CSF report indicating that the UE does not have the FDRSB cancellation capability.

Aspect 14: The method of any of Aspects 12-13, wherein the first one or more frequency domain resources are associated with mirrored frequency domain resources with respect to a carrier frequency of the frequency domain resource allocation, and wherein the second one or more frequency domain resources are not associated with mirrored frequency domain resources with respect to the carrier frequency.

Aspect 15: The method of any of Aspects 12-14, wherein the frequency domain resource allocation is an asymmetric frequency domain resource allocation with respect to a carrier frequency of the frequency domain resource allocation.

Aspect 16: The method of any of Aspects 12-15, wherein transmitting the one or more signals comprises: transmitting the one or more signals via the first one or more frequency domain resources using a first one or more transmitting operations; or transmitting the one or more signals via the second one or more frequency domain resources using a second one or more transmitting operations.

Aspect 17: The method of any of Aspects 12-16, wherein transmitting the one or more signals comprises: transmitting the one or more signals via the first one or more frequency domain resources using a first code rate; or transmitting the one or more signals via the second one or more frequency domain resources using a second code rate.

Aspect 18: The method of any of Aspects 12-17, wherein the first one or more frequency domain resources include a first one or more subcarriers, and wherein the second one or more frequency domain resources include a second one or more subcarriers.

Aspect 19: The method of any of Aspects 12-18, wherein the frequency domain resource allocation is a bandwidth configured for the UE.

Aspect 20: The method of any of Aspects 12-19, wherein the first MCS is associated with a lower order than the second MCS.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to cause the UE to:

transmit, to a network node, a channel state feedback (CSF) report indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment, wherein the first one or more frequency domain resources are associated with mirrored frequency domain resources with respect to a carrier frequency of the frequency domain resource allocation, and wherein the second one or more frequency domain resources are not associated with mirrored frequency domain resources with respect to the carrier frequency;

receive, from the network node and in association with transmitting the CSF report, an indication that the first MCS is to be used for the first one or more frequency domain resources and that the second MCS is to be used for the second one or more frequency domain resources; and receive, from the network node, one or more signals, associated with the frequency domain resource allocation, using the first MCS to decode the first one or more frequency domain resources and using the second MCS to decode the second one or more frequency domain resources.

2. The UE of claim 1, wherein the CSF report further indicates that the UE does not have an FDRSB cancellation capability, and wherein receiving the indication that the first MCS is to be used for the first one or more frequency domain resources and that the second MCS is to be used for the second one or more frequency domain resources is associated with the CSF report indicating that the UE does not have the FDRSB cancellation capability.

3. The UE of claim 1, wherein the frequency domain resource allocation is an asymmetric frequency domain resource allocation with respect to a carrier frequency of the frequency domain resource allocation.

4. The UE of claim 1, wherein transmitting the CSF report is associated with a comparison of a first noise level associated with the FDRSB impairment and a second noise level associated with thermal noise.

5. The UE of claim 4, wherein transmitting the CSF report is associated with a difference between the first noise level and the second noise level satisfying a threshold.

6. The UE of claim 1, wherein the one or more processors, to receive the one or more signals, are configured to:

receive the one or more signals via the first one or more frequency domain resources using a first one or more receiving operations; or receive the one or more signals via the second one or more frequency domain resources using a second one or more receiving operations.

7. The UE of claim 1, wherein the one or more processors, to receive the one or more signals, are configured to:

receive the one or more signals via the first one or more frequency domain resources using a first code rate; or receive the one or more signals via the second one or more frequency domain resources using a second code rate.

8. A network node for wireless communication, comprising:

a memory; and one or more processors, coupled to the memory, configured to cause the network node to:

receive a channel state feedback (CSF) report, associated with a user equipment (UE), indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment, wherein the first one or more frequency domain resources are associated with mirrored frequency domain resources with respect to a carrier frequency of the frequency domain resource allocation, and wherein the second one or more frequency domain resources are not associated with mirrored frequency domain resources with respect to the carrier frequency;

transmit, in association with receiving the CSF report, an indication that the first MCS is to be used by the UE for the first one or more frequency domain resources and that the second MCS is to be used by the UE for the second one or more frequency domain resources; and transmit one or more signals, associated with the frequency domain resource allocation, using the first MCS for the first one or more frequency domain resources and using the second MCS for the second one or more frequency domain resources.

9. The network node of claim 8, wherein the CSF report further indicates that the UE does not have an FDRSB cancellation capability, and wherein transmitting the indication that the first MCS is to be used by the UE for the first one or more frequency domain resources and that the second MCS is to be used by the UE for the second one or more frequency domain resources is associated with the CSF report indicating that the UE does not have the FDRSB cancellation capability.

10. The network node of claim 8, wherein the frequency domain resource allocation is an asymmetric frequency domain resource allocation with respect to a carrier frequency of the frequency domain resource allocation.

11. The network node of claim 8, wherein the one or more processors, to transmit the one or more signals, are configured to:

transmit the one or more signals via the first one or more frequency domain resources using a first one or more transmitting operations; or transmit the one or more signals via the second one or more frequency domain resources using a second one or more transmitting operations.

12. The network node of claim 8, wherein the one or more processors, to transmit the one or more signals, are configured to:

transmit the one or more signals via the first one or more frequency domain resources using a first code rate; or transmit the one or more signals via the second one or more frequency domain resources using a second code rate.

13. The network node of claim 8, wherein the first one or more frequency domain resources include a first one or more subcarriers, and wherein the second one or more frequency domain resources include a second one or more subcarriers.

14. A method of wireless communication performed by a user equipment (UE), comprising:

transmitting, to a network node, a channel state feedback (CSF) report indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment, wherein the first one or more frequency domain resources are associated with mirrored frequency domain resources with respect to a carrier frequency of the frequency domain resource allocation, and wherein the second one or more frequency domain resources are not associated with mirrored frequency domain resources with respect to the carrier frequency;

receiving, from the network node and in association with transmitting the CSF report, an indication that the first MCS is to be used for the first one or more frequency domain resources and that the second MCS is to be used for the second one or more frequency domain resources; and receiving, from the network node, one or more signals, associated with the frequency domain resource allocation, using the first MCS to decode the first one or more frequency domain resources and using the second MCS to decode the second one or more frequency domain resources.

15. The method of claim 14, wherein the CSF report further indicates that the UE does not have an FDRSB cancellation capability, and wherein receiving the indication that the first MCS is to be used for the first one or more frequency domain resources and that the second MCS is to be used for the second one or more frequency domain resources is associated with the CSF report indicating that the UE does not have the FDRSB cancellation capability.

16. The method of claim 14, wherein the frequency domain resource allocation is an asymmetric frequency domain resource allocation with respect to a carrier frequency of the frequency domain resource allocation.

17. The method of claim 14, wherein receiving the one or more signals comprises:

receiving the one or more signals via the first one or more frequency domain resources using a first code rate; or receiving the one or more signals via the second one or more frequency domain resources using a second code rate.

18. The method of claim 14, wherein the first one or more frequency domain resources include a first one or more subcarriers, and wherein the second one or more frequency domain resources include a second one or more subcarriers.

19. The method of claim 14, wherein the frequency domain resource allocation is a bandwidth configured for the UE.

20. The method of claim 14, wherein the first MCS is associated with a lower order than the second MCS.

21. A method of wireless communication performed by a network node, comprising:

receiving a channel state feedback (CSF) report, associated with a user equipment (UE), indicating a first modulation and coding scheme (MCS) associated with a first one or more frequency domain resources of a frequency domain resource allocation associated with the UE, and a second MCS associated with a second one or more frequency domain resources of the frequency domain resource allocation, the first one or more frequency domain resources being associated with a frequency dependent residual side band (FDRSB) impairment, wherein the first one or more frequency domain resources are associated with mirrored frequency domain resources with respect to a carrier frequency of the frequency domain resource allocation, and wherein the second one or more frequency domain resources are not associated with mirrored frequency domain resources with respect to the carrier frequency;

transmitting, in association with receiving the CSF report, an indication that the first MCS is to be used by the UE for the first one or more frequency domain resources and that the second MCS is to be used by the UE for the second one or more frequency domain resources; and transmitting one or more signals, associated with the frequency domain resource allocation, using the first MCS for the first one or more frequency domain resources and using the second MCS for the second one or more frequency domain resources.

22. The method of claim 21, wherein the CSF report further indicates that the UE does not have an FDRSB cancellation capability, and wherein transmitting the indication that the first MCS is to be used by the UE for the first one or more frequency domain resources and that the second MCS is to be used by the UE for the second one or more frequency domain resources is associated with the CSF report indicating that the UE does not have the FDRSB cancellation capability.

23. The method of claim 21, wherein the frequency domain resource allocation is an asymmetric frequency domain resource allocation with respect to a carrier frequency of the frequency domain resource allocation.

24. The method of claim 21, wherein transmitting the one or more signals comprises:

transmitting the one or more signals via the first one or more frequency domain resources using a first one or more transmitting operations; or transmitting the one or more signals via the second one or more frequency domain resources using a second one or more transmitting operations.

25. The method of claim 21, wherein the frequency domain resource allocation is a bandwidth configured for the UE.

26. The method of claim 21, wherein the first MCS is associated with a lower order than the second MCS.

27. The method of claim 14, wherein transmitting the CSF report is associated with a comparison of a first noise level associated with the FDRSB impairment and a second noise level associated with thermal noise.

28. The method of claim 27, wherein transmitting the CSF report is associated with a difference between the first noise level and the second noise level satisfying a threshold.

29. The UE of claim 1, wherein the frequency domain resource allocation is a bandwidth configured for the UE.

30. The network node of claim 8, wherein the frequency domain resource allocation is a bandwidth configured for the UE.

* * * * *